United States Patent
Otterstrom et al.

(10) Patent No.: US 12,416,824 B1
(45) Date of Patent: Sep. 16, 2025

(54) ULTRAVIOLET AND VISIBLE LIGHT INTEGRATED ACOUSTO-OPTIC MODULATORS

(71) Applicant: National Technology & Engineering Solutions of Sandia, LLC, Albuquerque, NM (US)

(72) Inventors: Nils Thomas Otterstrom, Edgewood, NM (US); Matt Eichenfield, Albuquerque, NM (US); Daniel Dominguez, Albuquerque, NM (US); Andrew Jay Leenheer, Albuquerque, NM (US)

(73) Assignee: National Technology & Engineering Solutions of Sandia, LLC., Albuquerque, NM (US)

( * ) Notice: Subject to any disclaimer, the term of this patent is extended or adjusted under 35 U.S.C. 154(b) by 286 days.

(21) Appl. No.: 18/101,222

(22) Filed: Jan. 25, 2023

Related U.S. Application Data

(60) Provisional application No. 63/306,219, filed on Feb. 3, 2022.

(51) Int. Cl.
*G02F 1/125* (2006.01)
*G02F 1/00* (2006.01)
(Continued)

(52) U.S. Cl.
CPC ............ *G02F 1/125* (2013.01); *G02F 1/0009* (2013.01); *H04J 14/04* (2013.01); *B06B 1/0644* (2013.01)

(58) Field of Classification Search
CPC ........ G02F 1/125; G02F 1/0009; H04J 14/04; B06B 1/0644
See application file for complete search history.

(56) References Cited

U.S. PATENT DOCUMENTS

| | | | | |
|---|---|---|---|---|
| 7,869,669 B2* | 1/2011 | Mitomi | ................. | G02F 1/0356 385/3 |
| 8,644,647 B2* | 2/2014 | Ichikawa | .............. | G02F 1/2255 385/2 |

(Continued)

OTHER PUBLICATIONS

Sohn, D.B., Kim, S. & Bahl, G. Time-reversal symmetry breaking with acoustic pumping of nanophotonic circuits. Nature Photon 12, 91-97 (2018). https://doi.org/10.1038/s41566-017-0075-2 (Year: 2018).*

(Continued)

*Primary Examiner* — Peter Radkowski
(74) *Attorney, Agent, or Firm* — Mark A. Dodd

(57) ABSTRACT

An acousto-optic modulator that includes a waveguide on an acoustic actuator is disclosed. The waveguide carries an optical signal having a UV or visible wavelength. When the acoustic actuator is activated, the optical signal in the waveguide is bathed in intense acoustic waves. By using a waveguide having the appropriate dimensions to strongly confine both the optical signal and the acoustic waves, strong optomechanical coupling may be achieved between the optical and acoustic modes, resulting in an efficient modulator. By employing either intra-modal or inter-modal conversion, the modulator may be used to implement a variety of dual- or single-sideband functions, including an isolator, a phase modulator, a single-sideband frequency shifter, or a high-extinction shutter.

17 Claims, 15 Drawing Sheets

(51) Int. Cl.
*H04J 14/04* (2006.01)
*B06B 1/06* (2006.01)

(56) References Cited

U.S. PATENT DOCUMENTS

| | | | | |
|---|---|---|---|---|
| 9,335,568 | B1* | 5/2016 | Yap | G02F 1/065 |
| 10,018,888 | B2* | 7/2018 | Thaniyavarn | G02F 1/2255 |
| 10,133,142 | B2* | 11/2018 | Doerr | G02F 1/025 |
| 10,295,844 | B2* | 5/2019 | Kissa | G02F 1/0316 |
| 10,705,354 | B2* | 7/2020 | Menezo | G02F 1/025 |
| 10,890,787 | B2* | 1/2021 | Kawamura | G02F 1/2255 |
| 2006/0251425 | A1* | 11/2006 | Kupershmidt | G02B 6/022 398/147 |
| 2009/0290830 | A1* | 11/2009 | Mitomi | G02F 1/0356 385/3 |
| 2010/0232736 | A1* | 9/2010 | Ichikawa | G02F 1/0356 385/2 |
| 2014/0205229 | A1* | 7/2014 | Thaniyavarn | G02F 1/225 385/3 |
| 2016/0291352 | A1* | 10/2016 | Kissa | G02F 1/0316 |
| 2017/0285437 | A1* | 10/2017 | Doerr | G02F 1/2257 |
| 2019/0025615 | A1* | 1/2019 | Kawamura | G02F 1/025 |
| 2019/0243167 | A1* | 8/2019 | Menezo | G02F 1/025 |

OTHER PUBLICATIONS

De Lima, M. M. et al. Compact Mach-Zehnder acousto-optic modulator. Appl. Phys. Lett. 89, 121104 (2006). (Year: 2006).*
Li, H., Liu, Q. Y. & Li, M. Electromechanical Brillouin scattering in integrated planar photonics. APL Photonics 4, 080802 (2019). (Year: 2019).*
Aslan et al, Low-Loss Optical Waveguides for the Near Ultra-Violet and Visible Spectral Regions with Al2O3 Thin Films from Atomic Layer Deposition, Thin Solid Films. Jun. 30, 2010; 518(17): 4935-4940. doi:10.1016/j.tsf.2010.03.011. (Year: 2010).*
Yu, Z. J. & Sun, X. K. Gigahertz acousto-optic modulation and frequency shifting on etchless lithium niobate integrated platform. ACS Photonics 8, 798-803 (2021). (Year: 2021).*
Sohn et al., Direction reconfigurable nonreciprocal acousto-optic modulator on chip. APL Photonics Dec. 1, 2019; 4 (12): 126103. https://doi.org/10.1063/1.5123497 (Year: 2019).*
Jiang, W. T. et al. Efficient bidirectional piezo-optomechanical transduction between microwave and optical frequency. Nat. Commun. 11, 1166 (2020). (Year: 2020).*
Cai, L. T. et al. Acousto-optical modulation of thin film lithium niobate waveguide devices. Photonics Res. 7, 1003-1013 (2019). (Year: 2019).*
Shao, L. B. et al. Microwave-to-optical conversion using lithium niobate thin-film acoustic resonators. Optica 6, 1498-1505 (2019). (Year: 2019).*
Zhu, D. et al. Integrated photonics on thin-film lithium niobate. Adv. Opt. Photonics 13, 242-352 (2021). (Year: 2021).*
Voloshinov, V. & Linde, Bogumil & Yushkov, K.. (2008). Acousto-optic processing of images in visible and ultraviolet light. European Physical Journal: Special Topics. 154. 225-228. 10.1140/epjst/e2008-00550-1. (Year: 2008).*
Bernier et al., Nonreciprocal reconfigurable microwave optomechanical circuit. Nat Commun 8, 604 (2017). https://doi.org/10.1038/s41467-017-00447-1 (Year: 2017).*
Eggleton et al., Brillouin integrated photonics. Nat. Photonics 13, 664-677 (2019). https://doi.org/10.1038/s41566-019-0498-z (Year: 2019).*
Liu et al., On-Chip Backward Inter-modal Brillouin Scattering, in Conference on Lasers and Electro-Optics, OSA Technical Digest (Optica Publishing Group, 2019), paper STh1J.4. (Year: 2019).*
Wang et al., Design and Fabrication of S0 Lamb-Wave Thin-Film Lithium Niobate Micromechanical Resonators, in Journal of Microelectromechanical Systems, vol. 24, No. 2, pp. 300-308, Apr. 2015, doi: 10.1109/JMEMS.2014.2384916. (Year: 2014).*
Shao et al., Integrated microwave acousto-optic frequency shifter on thin-film lithium niobate, Opt. Express 28, 23728-23738 (2020) (Year: 2020).*
Otterstrom et al., Resonantly enhanced nonreciprocal silicon Brillouin amplifier, Optica 6, 1117-1123 (2019) (Year: 2019).*
Pradeep et al., Simulation of Unidirectional Interdigital Transducers in SAW Devices using COMSOL Multiphysics, Excerpt from the Proceedings of the COMSOL Conference 2008 Hannover (Year: 2008).*
Peterson et al., Strong Nonreciprocity in Modulated Resonator Chains through Synthetic Electric and Magnetic Fields. Phys. Rev. Lett. 123, 063901—Published Aug. 7, 2019. DOI: https://doi.org/10.1103/PhysRevLett.123.063901 (Year: 2019).*
Kittlaus et al. Electrically driven acousto-optics and broadband non-reciprocity in silicon photonics. Published Nov. 2, 2020. Nat. Photonics 15, 43-52 (2021). https://doi.org/10.1038/s41566-020-00711-9 (Year: 2020).*
Kittlaus et al., On-chip inter-modal Brillouin scattering. Nat Commun 8, 15819 (2017). https://doi.org/10.1038/ncomms15819 (Year: 2017).*
Kharel, P. et al., "Noise and dynamics in forward Brillouin interactions," Physical Review A (2016) 93:063806, 12 pages.
Kittlaus, E. A. et al., "On-chip inter-modal Brillouin scattering," Nature Communications (2017) 8:15819, 9 pages.
Kittlaus, E. A. et al., "Non-reciprocal interband Brillouin modulation," Nature Photonics (2018) 12:613-619.
Lehtonen, S. et al., "Unidirectional SAW Transducer for Gigahertz Frequencies," IEEE transactions on Ultrasonics, Ferroelectrics, and Frequency Control (2003) 50(11):1404-1406.

* cited by examiner

980A

980B

ULTRAVIOLET AND VISIBLE LIGHT INTEGRATED ACOUSTO-OPTIC MODULATORS

RELATED APPLICATIONS

This application claims priority to U.S. Provisional Application No. 63/306,219, filed on Feb. 3, 2022, and entitled ULTRAVIOLET AND VISIBLE LIGHT INTEGRATED ACOUSTO-OPTIC MODULATORS, the entirety of which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

TECHNICAL FIELD

The present invention relates to acousto-optic modulators compatible with standard CMOS processing providing enhanced functionality, including phase modulators, single-sideband frequency shifters, high-extinction shutters, and optical isolators, to integrated silicon photonics.

BACKGROUND

While strides have been made in the field of silicon photonics, scaling existing devices to shorter wavelengths in the ultraviolet (UV) and visible wavelength range has proven difficult. This is especially true for acousto-optic (AO) based devices. In particular, achieving backward AO scattering (analog of the traditional backward stimulated Brillouin scattering (SBS)) that produces single-sideband modulation, is challenging for several reasons. In particular, the required acoustic frequencies are quite high (up to ~40 GHz for some materials), resulting in correspondingly very short wavelengths (~200 nm), making efficient electromechanical transduction difficult. Further, such devices are very difficult to tune.

An alternative to the backward AO realm is to launch the acoustic wave normal to the direction of the light. This relaxes the frequency and wavelength requirements, and the result is a dual-sideband process as both the Stokes and anti-Stokes couple to the same phonon. While this approach leads to efficient phase modulation, which is important for various optical signal processing techniques, some applications require single sideband modulation.

Thus, the need exists for a device structure that can strongly confine both the optical and acoustic energies, provide strong optomechanical coupling between the optical and acoustic modes, and enables both dual-sideband and single-sideband operation at UV and visible wavelengths.

SUMMARY

One aspect of the present invention relates to an AO modulator that includes a waveguide on an acoustic actuator. The waveguide carries an optical signal having a UV or visible wavelength. When the acoustic actuator is activated, the optical signal in the waveguide is bathed in intense acoustic waves. By using a waveguide having the appropriate dimensions to strongly confine both the optical signal and the acoustic waves, strong optomechanical coupling may be achieved between the optical and acoustic modes, resulting in an efficient modulator. Using a single optical spatial mode enables efficient phase modulation. In addition, by using two optical spatial modes and employing either intra-modal or inter-modal conversion, the modulator may be used to implement a variety of dual- or single-sideband functions, including an isolator, a phase modulator, a single-sideband frequency shifter, or a high-extinction shutter.

In at least one embodiment of the invention, an acousto-optic (AO) modulator comprises a substrate, an acoustic actuator on the substrate (the acoustic actuator receiving an actuator signal and producing a corresponding acoustic signal upon receipt of the actuator signal, the substrate reducing an acoustic radiation loss from the acoustic actuator), and a waveguide on a surface of the acoustic actuator (the waveguide guiding an optical signal, confining an energy of the optical signal, and confining an energy of the acoustic signal such that efficient optomechanical coupling occurs between the optical signal and the acoustic signal), wherein the AO modulator operates in one of an intra-modal mode or an inter-modal mode.

In various embodiments, the substrate includes a silicon wafer, a silicon wafer with a silica overlayer, or a sapphire wafer; the acoustic actuator includes an active layer, a first electrode on a surface of the active layer, and a second electrode (the second electrode on a same or opposite surface of the active layer as the first electrode); the active layer includes aluminum nitride, scandium aluminum nitride, lithium niobate, or quartz; the first and second electrodes include aluminum, an aluminum alloy, a silicide, or gold; at least one of the first electrode or the second electrode is patterned to form a directional acoustic transducer as part of the acoustic actuator (the directional acoustic transducer generating the acoustic signal); the directional acoustic transducer is a unidirectional acoustic transducer or a bidirectional acoustic transducer; and the directional acoustic transducer is a single-phase unidirectional transducer, a focusing acoustic transducer, or a chirped acoustic transducer.

In other embodiments, the waveguide includes a waveguide core and a cladding surrounding the waveguide core; the waveguide core includes silicon nitride, alumina, tantalum pentoxide, gallium phosphide, or titanium oxide; and the cladding includes silica; an optomechanical coupling coefficient |g| is greater than or equal to approximately $$50 \frac{\text{rad}}{s} * \sqrt{m};$$

and the AO modulator further comprises a pedestal, a tether, or a nano-pillar (the pedestal, the tether, or the nano-pillar coupling the acoustic actuator to the substrate and reducing the acoustic radiation loss from the acoustic actuator to the substrate).

In still other embodiments, the AO modulator implements an isolator function, a phase modulator function, a single-sideband frequency shifter function, or a high-extinction shutter function; the AO modulator implements an isolator function, the AO modulator further comprises a first mode multiplexer (the first mode multiplexer optically coupled to a first end of the waveguide, the first mode multiplexer including a passing port (the passing port receiving a forward input optical signal in a fundamental optical mode, the first mode multiplexer optically coupling the forward input optical signal to the waveguide) and a blocking port (the blocking port receiving a reverse output optical signal in a higher order optical mode from the waveguide, the first mode multiplexer isolating the reverse output optical signal from the passing port)), and a second mode multiplexer (the second mode multiplexer optically coupled to a second end of the waveguide opposite the first end of the waveguide, the second mode multiplexer including a second port, the second mode multiplexer receiving a forward output optical signal in a higher order optical mode from the waveguide and transmitting the forward output optical signal to the second port, the second mode multiplexer further receiving a reverse input optical signal in a higher order optical mode from the second port and optically coupling the reverse input optical signal to the waveguide); the AO modulator implements a phase modulator function, the acoustic signal being a phononic standing wave; the AO modulator implements a single-sideband frequency shifter function, the AO modulator further comprises a first mode multiplexer (the first mode multiplexer optically coupled to a first end of the waveguide, the first mode multiplexer including a first port (the first port receiving a forward input optical signal in a fundamental optical mode, the first mode multiplexer optically coupling the forward input optical signal to the waveguide)), and a second mode multiplexer (the second mode multiplexer optically coupled to a second end of the waveguide opposite the first end of the waveguide, the second mode multiplexer including a second port (the second mode multiplexer receiving a forward output optical signal in a higher order optical mode from the waveguide and transmitting the forward output optical signal to the second port)); and the AO modulator implements a high-extinction shutter function, the AO modulator further comprises a mode multiplexer (the mode multiplexer optically coupled to a first end of the waveguide, the first mode multiplexer including a second port, the mode multiplexer receiving an input optical signal in a higher order optical mode from the second port and optically coupling the input optical signal to the waveguide), and a mode filter (the mode filter optically coupled to a second end of the waveguide opposite the first end of the waveguide, the mode filter including a port, the mode filter receiving an output optical signal from the waveguide and transmitting the output optical signal from the port when the output optical signal is in a fundamental optical mode, the mode filter further blocking the output optical signal when the output optical signal is in the higher order optical mode).

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings. The drawings are not to scale and are intended only to illustrate the elements of various embodiments of the present invention.

FIGS. 2A-2C illustrate cross-sections of pedestal, tether, and nano-pillar embodiments in support regions, respectively, while

FIG. 6A illustrates the simulated $E_x$ optical field of an AO modulator in accordance with one or more embodiments of the present invention, while

FIGS. 10A and 10B illustrate the simulated $E_x$ optical fields of the first two optical modes for an AO modulator in accordance with one or more embodiments of the present invention, while

FIGS. 12A and 12B illustrate the forward and reverse operation, respectively, of an isolator in accordance with one or more embodiments of the present invention, while

DETAILED DESCRIPTION

Figure 1:
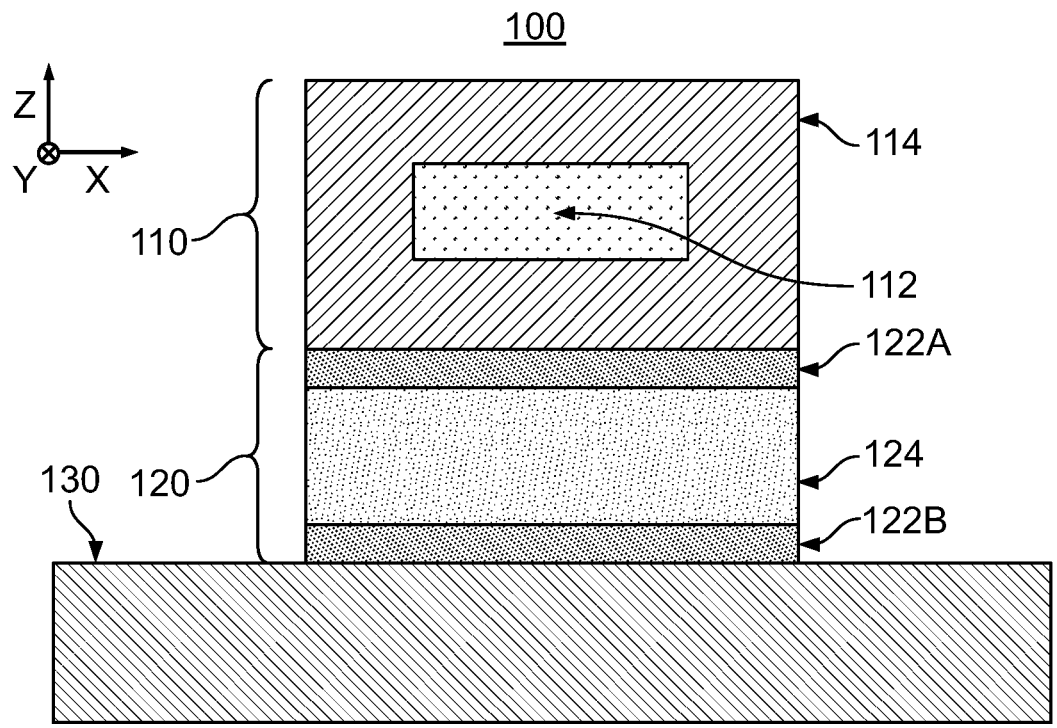
FIG. 1 illustrates an AO modulator in accordance with one or more embodiments of the present invention.

FIG. 1 illustrates an acousto-optic (AO) modulator 100 in accordance with one or more embodiments. The AO modulator 100 illustrated in FIG. 1 is designed to operate at the visible wavelength of 785 nm. The AO modulator 100 includes both a waveguide 110 and an acoustic actuator 120. The waveguide 110 includes a waveguide core 112 and a corresponding cladding 114 surrounding the waveguide core 112. In various embodiments, the waveguide core 112 may have a thickness between approximately 50 nm and approximately 500 nm and a width of between approximately 100 nm and 1.5 µm. In various embodiments, the cladding 114 may have a thickness between approximately 100 nm and approximately 1 µm. In this embodiment of the AO modulator 100, the waveguide core 112 is formed of silicon nitride ($Si_3N_4$), while the cladding 114 is formed of silica ($SiO_2$). The acoustic actuator 120 includes a pair of electrodes 122A, 122B and a piezoelectric active layer 124. In various embodiments, the electrodes 122A, 122B may have a thickness between approximately 100 nm and approximately 400 nm, while the piezoelectric active layer 124 may have a thickness between approximately 200 nm and approximately 1 µm. The widths of the electrodes 122A, 122B and the piezoelectric active layer 124 are the same and will be determined by the width of the waveguide core 112 and the thickness of the cladding 114. By applying an actuator signal, for example, a radio frequency (RF) signal, to the electrodes 122A, 122B, the acoustic actuator 120 generates a corresponding acoustic signal comprising phonons. In this embodiment of the AO modulator 100, the electrodes 122A, 122B are formed of aluminum (Al), while the active layer 124 is formed of aluminum nitride (AlN). In other embodiments, the active layer 124 may be formed of scandium aluminum nitride (ScAlN), lithium niobate (LiNbO$_3$), or quartz (SiO$_2$). The waveguide 110 and the acoustic actuator 120 of the AO modulator 100 are formed on a substrate 130. The illustrated substrate 130 is formed of SiO$_2$, which may be formed on an underlying silicon (Si) substrate (not illustrated), i.e., a Si substrate with a SiO$_2$ overlayer.

Figure 2A:
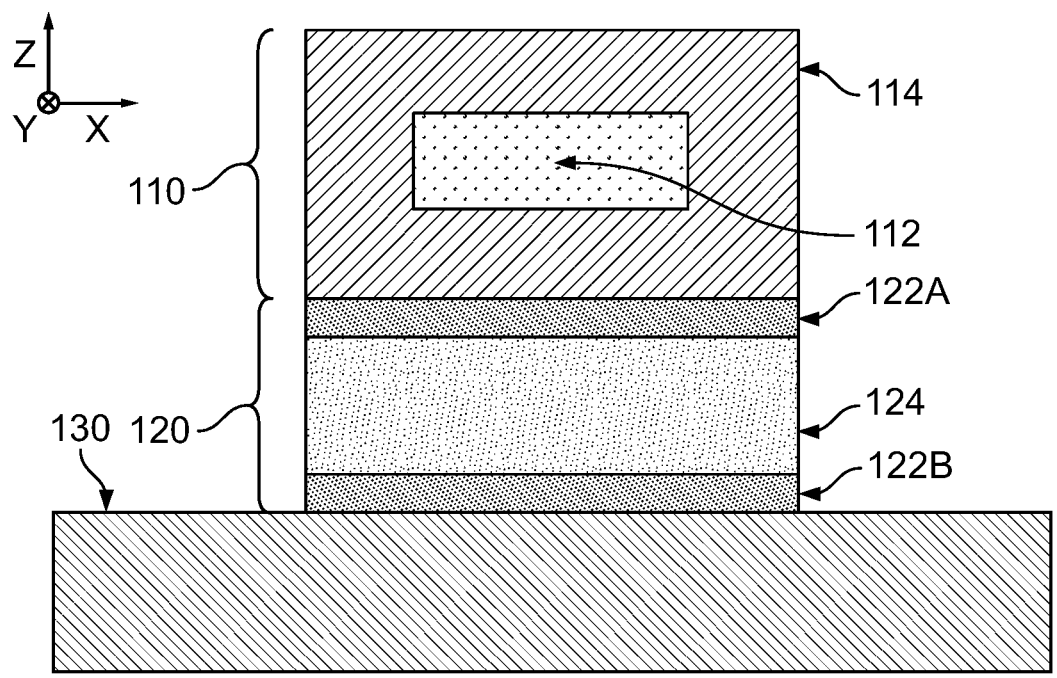
Figure 2B:
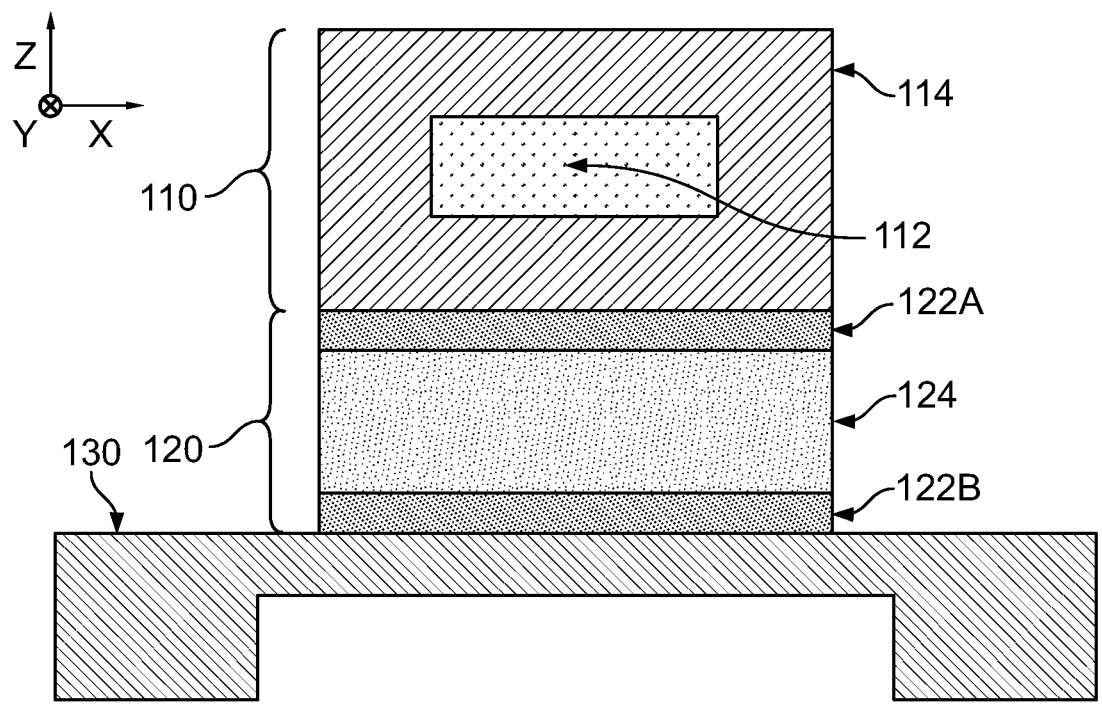
Figure 2C:
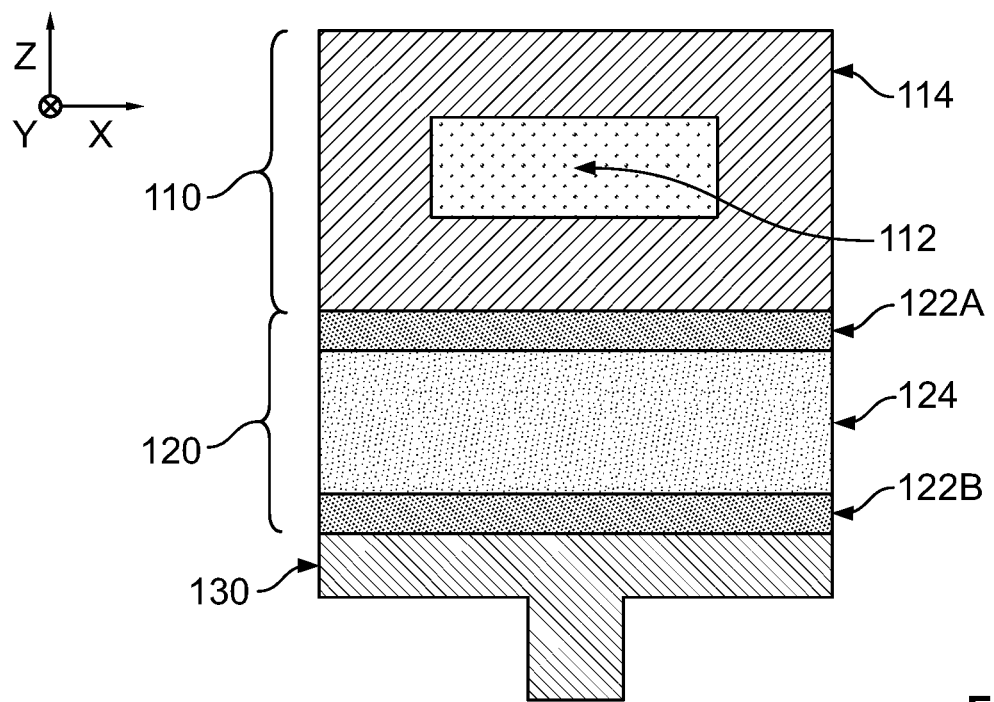
Figure 2D:
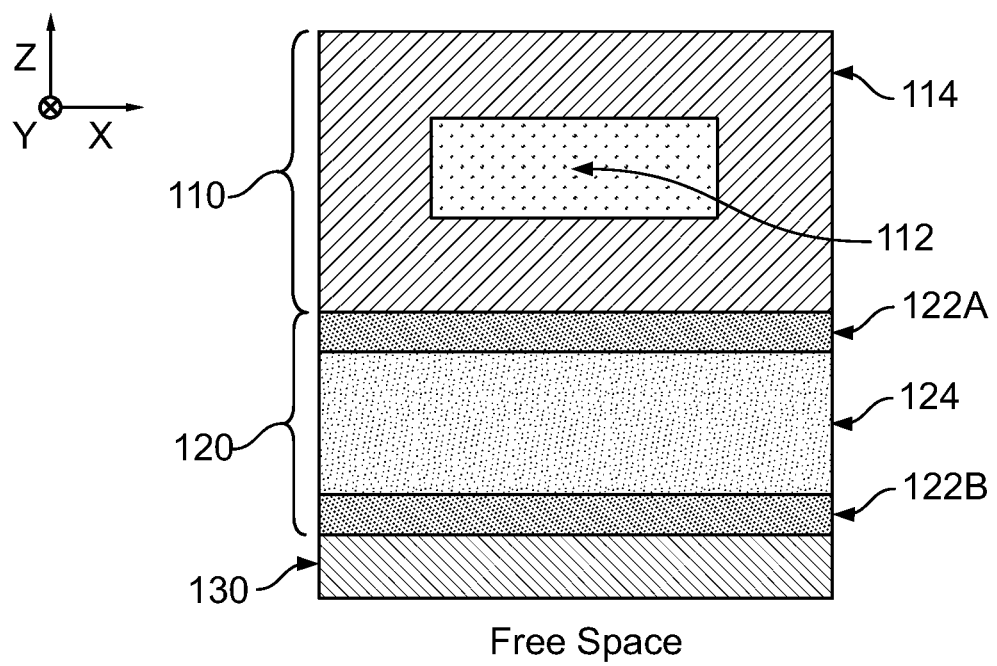
FIGS. 2D-2F illustrate cross-sections of pedestal, tether, and nano-pillar embodiments in suspended regions, respectively, of AO modulators in accordance with various embodiments of the present invention
Figure 2E:
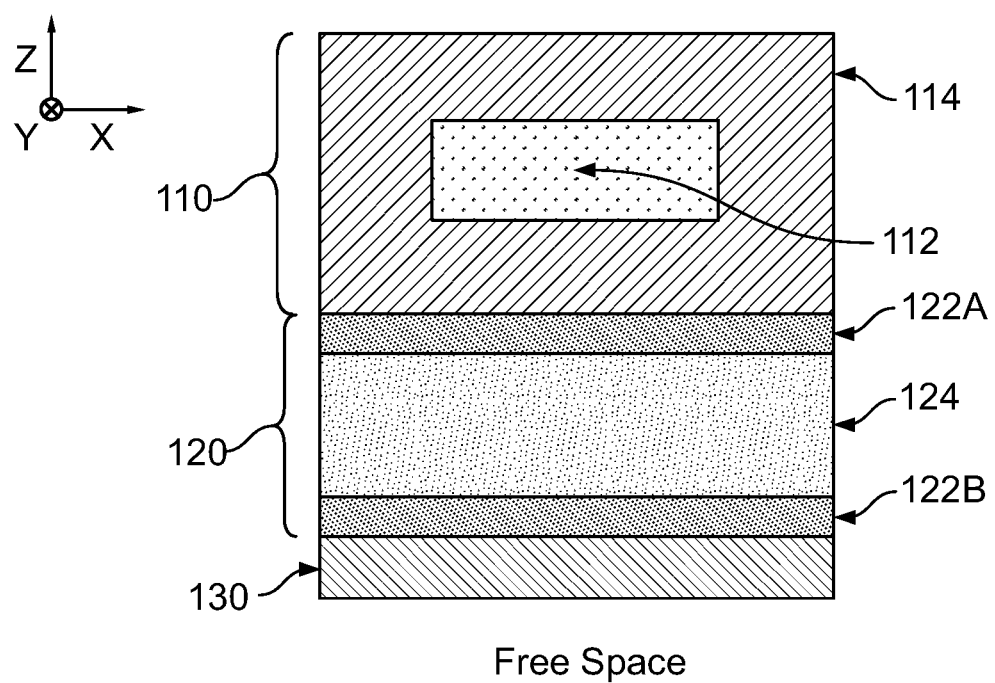
Figure 2F:
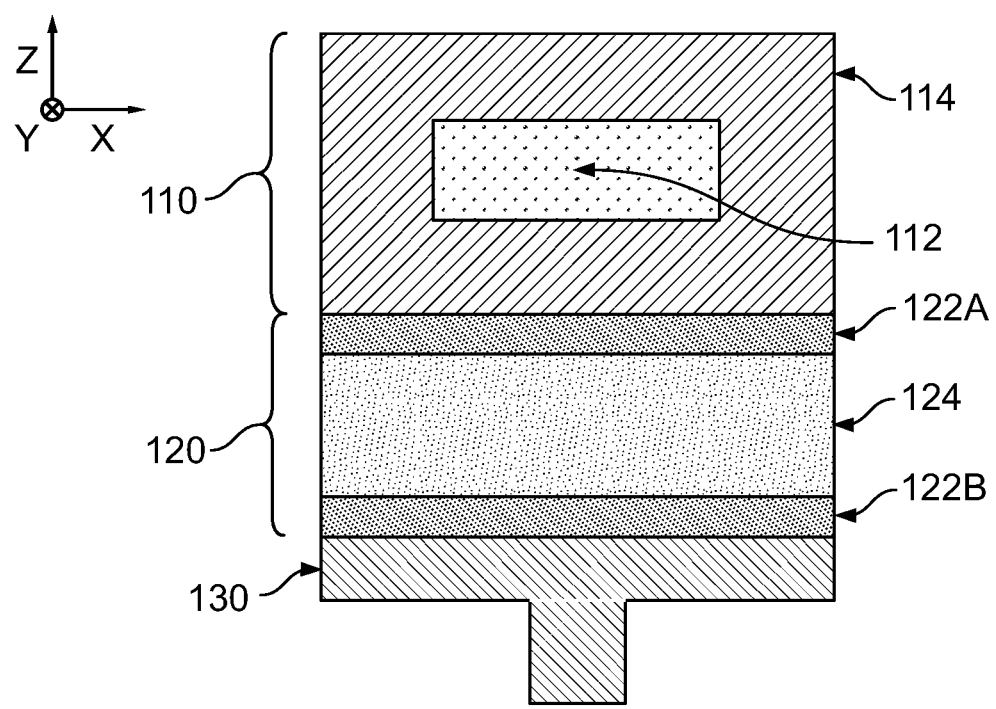

In other embodiments, the substrate 130 may be fully or partially released using pedestals, tethers, or nano-pillars to improve the acoustic confinement for certain elastic modes. FIGS. 2A-2C illustrate cross-sections of the pedestal, tether, and nano-pillar embodiments in the support regions, i.e., where the waveguide 110 and the acoustic actuator 120 are either directly or indirectly supported by the substrate 130, respectively. FIGS. 2D-2F illustrate cross-sections of the pedestal, tether, and nano-pillar embodiments in the suspended regions, i.e., the regions between the support regions, respectively. As illustrated in FIGS. 2D and 2E, a region of free space is located directly below the acoustic actuator 120. The number of support regions will be a function of, among other things, the overall length of the waveguide 110 and the acoustic actuator 120, and the structural rigidity of the waveguide 110 and the acoustic actuator 120.

Figure 3A:
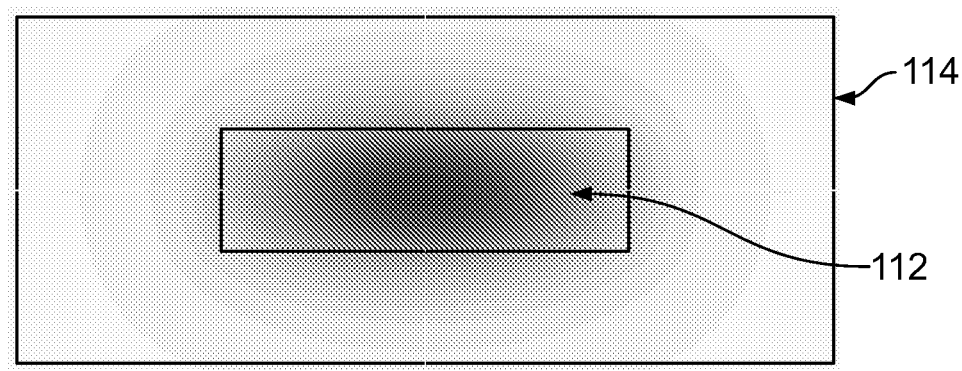
FIGS. 3A and 3B illustrate the simulated $E_x$ optical field and $\epsilon_{yy}$ strain mode, respectively, of an AO modulator in accordance with one or more embodiments of the present invention.

Due to the guiding nature of the waveguide 110, the optical energy is strongly confined to the waveguide 110. Due to the device/air discontinuity at the boundary of the AO modulator 100, the acoustic energy is likewise confined by the waveguide 110. By properly designing the dimensions of the various components of the AO modulator 100, efficient optomechanical coupling can be achieved as the optical and acoustic modes both resonate within the waveguide 100 and strongly overlap. The optical energy, at an optical wavelength of 785 nm, is strongly confined to the waveguide core 112 in the TE optical mode, with FIG. 3A illustrating the simulated $E_x$ optical field. In like manner, the acoustic energy, at 2.39 GHz, is also strongly confined to the waveguide 110, with FIG. 3B illustrating the simulated $\epsilon_{yy}$ strain mode.

Figure 4:
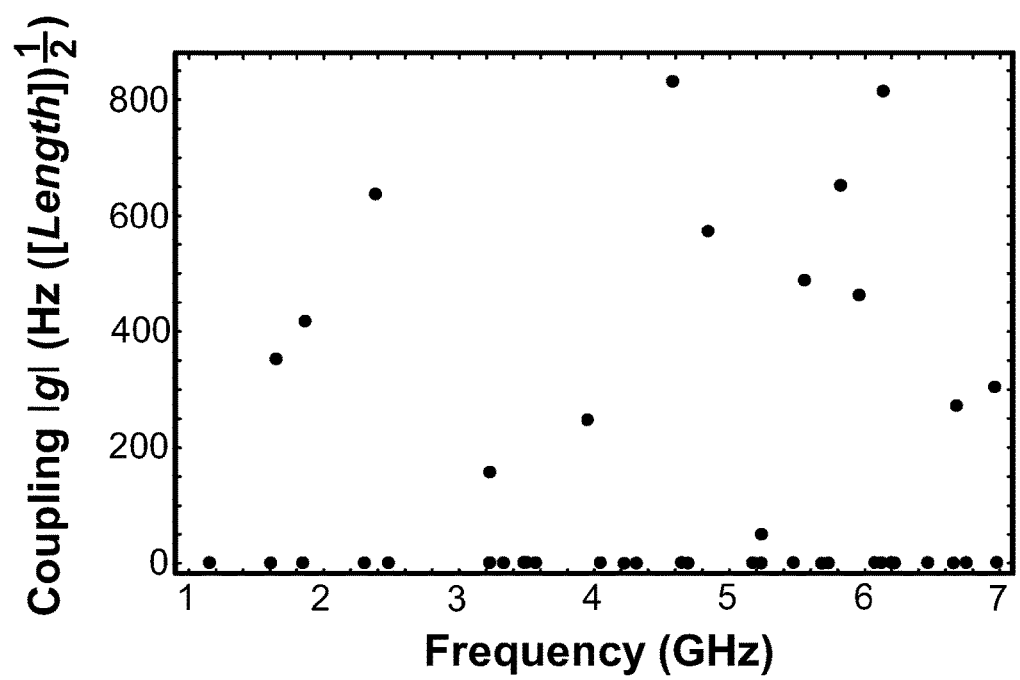
FIG. 4 illustrates the optomechanical coupling coefficient $|g|$ as a function of the acoustic frequency for AO modulators in accordance with various embodiments of the present invention.

FIG. 4 illustrates the coupling coefficient |g| of the AO modulator 100 as a function of the acoustic frequency with numerous configurations providing optomechanical coupling coefficients |g| in excess of $$200\frac{\text{rad}}{s}*\sqrt{m}.$$

Figure 3B:
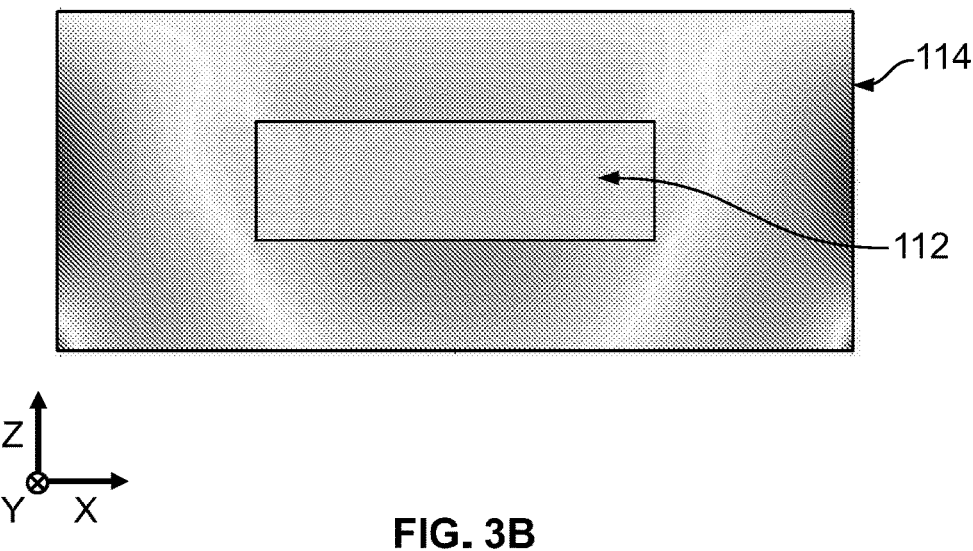

The modes of the AU modulator 100 illustrated in FIGS. 1, 3A, and 3B, also illustrated in FIG. 4, produced a coupling coefficient |g| of approximately $$650\frac{\text{rad}}{s}*\sqrt{m},$$

assuming a fixed boundary condition at the interface between the electrode 122B and the substrate 130. This coupling coefficient |g| was calculated using the following, corresponding to equation (14) from P. Kharel et al., "Noise and dynamics in forward Brillouin interactions," Physical Review A, vol. 93, art. no. 063806 (2016), the contents of which are incorporated herein by reference:

$$g_{pe} = \xi \int dr_\perp \left(D^i_{\gamma'}(r_\perp)\right)^* D^j_{\gamma'}(r_\perp) p^{ijkl}(r_\perp)\frac{\partial u^k_0(r_\perp)}{\partial r^l}. \quad \text{(Eq. 1)}$$

As the coupling coefficient |g| of bulk AO modulators is approximately $$1\frac{\text{rad}}{s}*\sqrt{m},$$

various embodiments of the present invention provide two full orders of magnitude improvement. It should be noted that high coupling coefficient |g| values can be achieved even at frequencies in excess of 5 GHz.

Figure 5:
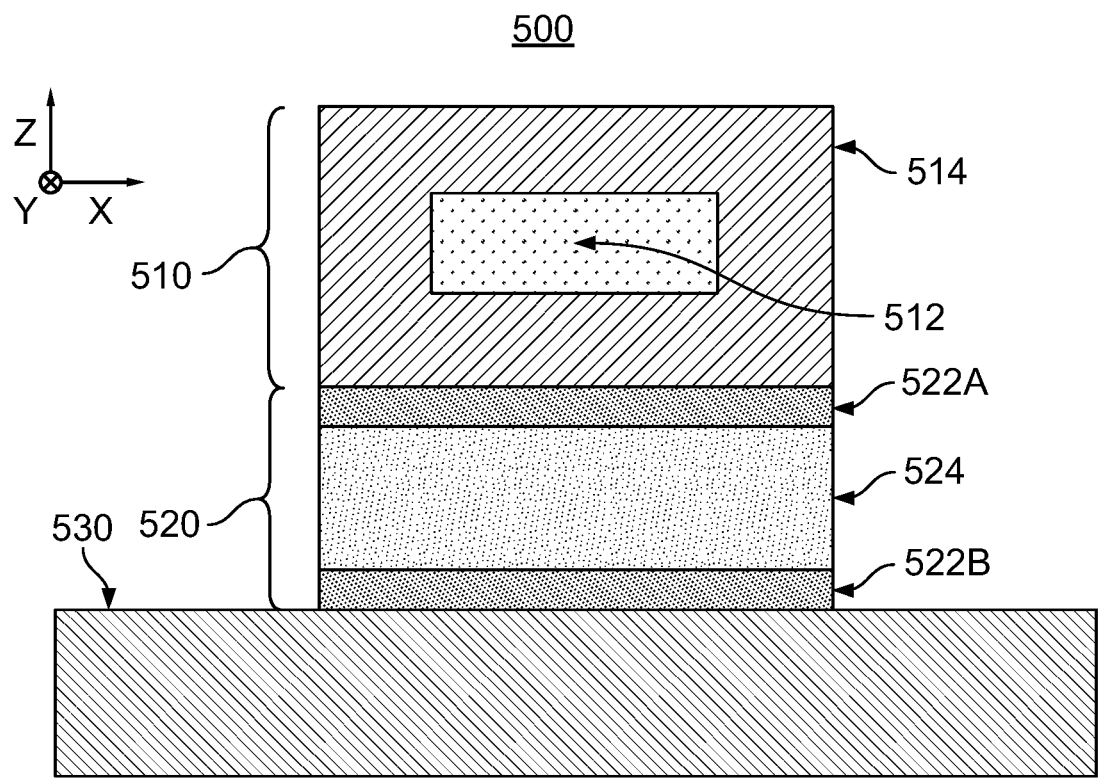
FIG. 5 illustrates an AO modulator in accordance with one or more embodiments of the present invention.

FIG. 5 illustrates an AO modulator 500 designed to extend operation out to the UV and near UV wavelength range. The AO modulator 500 illustrated in FIG. 5 is designed to operate at 420 nm. As with the AO modulator 100 illustrated in FIG. 1, the AO modulator 500 illustrated in FIG. 5 includes both a waveguide 510 and an acoustic actuator 520. The waveguide 510 includes a waveguide core 512 and a corresponding cladding 514 surrounding the waveguide core 512. In this embodiment of the AO modulator 500, the waveguide core 512 is formed of alumina (Al$_2$O$_3$), while the cladding 514 is again formed of SiO$_2$. In other embodiments, the waveguide core 512 may be formed, for example, of tantalum pentoxide (Ta$_2$O$_5$), gallium phosphide (GaP), titanium oxide (TiO$_2$), or any other low-loss optical material having an optical index of refraction greater than the cladding 514. In other embodiments, the cladding 514 may, for example, be formed of any other material having a low optical index of refraction and a low sound velocity. The acoustic actuator 520 includes a pair of electrodes 522A, 522B and a piezoelectric active layer 524. As above, the application of an RF signal to the electrodes 522A, 522B causes the acoustic actuator 520 to generate a corresponding acoustic signal comprising phonons. In this embodiment of the AO modulator 500, the electrodes 522A, 522B are again formed of Al, while the piezoelectric active layer 524 is formed of AlN. In other embodiments, the electrodes 522A, 522B may, for example, be formed of an aluminum/copper alloy (AlCu), a silicide, gold, or other low resistance material that is compatible with the fabrication process. In other embodiments, the piezoelectric active layer 524 may, for example, be formed of LiNbO$_3$, ScAlN, gallium nitride (GaN), or zinc oxide (ZnO). The waveguide 510 and the acoustic actuator 520 of the AO modulator 500 are formed on a substrate 530. The illustrated substrate 530 is formed of SiO$_2$, which may be formed on an underlying Si substrate (not illustrated). In other embodiments, the substrate 530 may, for example, be formed of sapphire or other high stiffness, high sound velocity material such that the acoustic energy is kept in the waveguide 510.

Figure 6A:
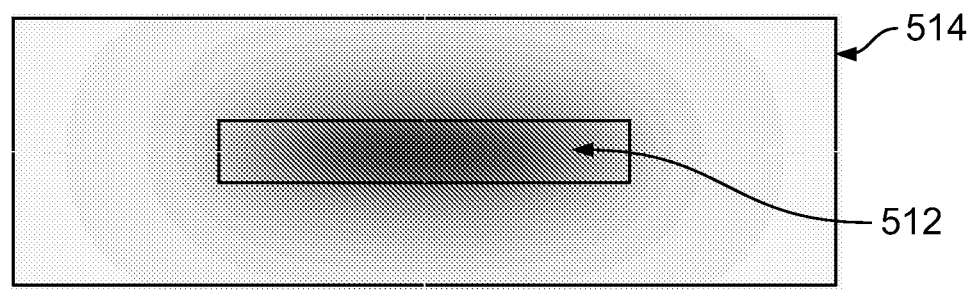
Figure 6A:
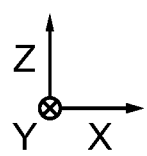
Figure 6B:
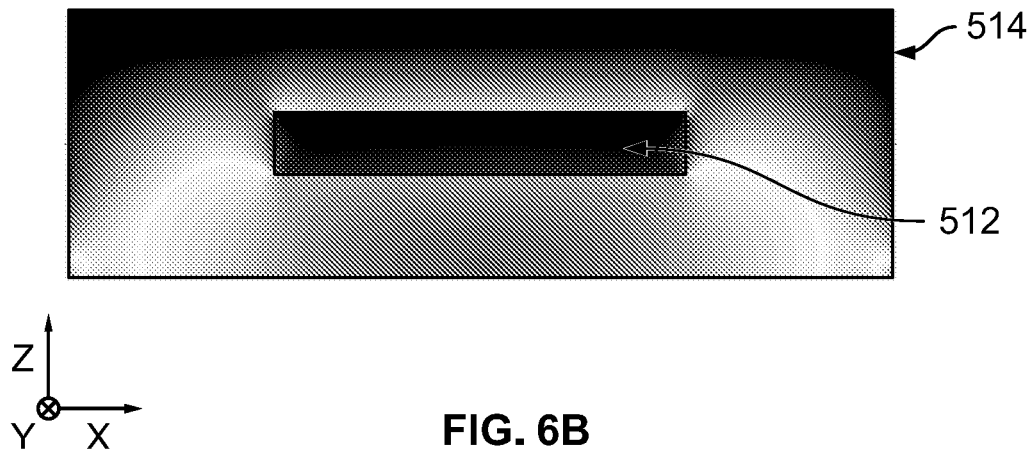
FIGS. 6B and 6C illustrate the corresponding simulated $\epsilon_{yy}$ strain modes at two different phonon frequencies.
Figure 6C:
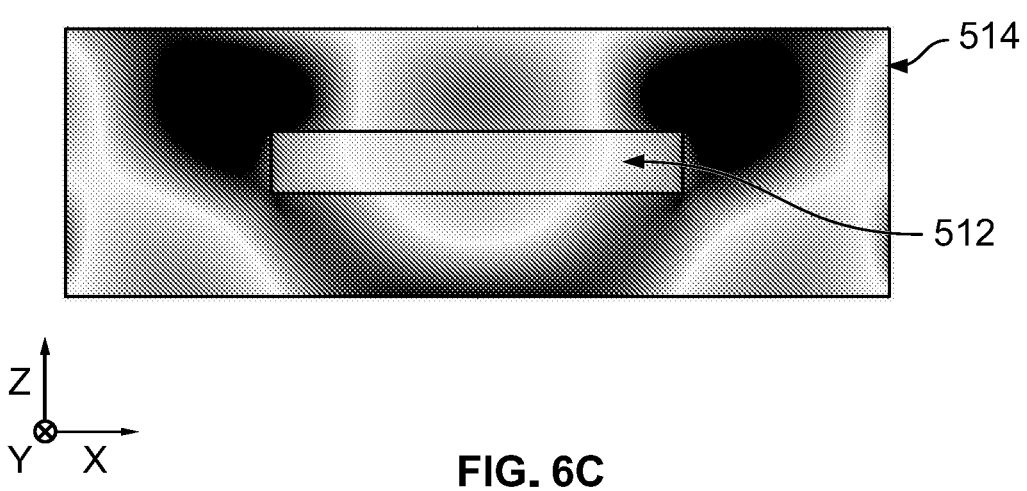

As with the AO modulator 100 illustrated in FIG. 1, the optical and acoustic energies in the AO modulator 500 illustrated in FIG. 5 are strongly confined to the waveguide 510. By properly designing the dimensions of the various components of the AO modulator 500, efficient optomechanical coupling can be achieved as the optical and acoustic modes strongly overlap. The optical energy, at a wavelength of 420 nm, is strongly confined to the waveguide core 512 in the TE optical mode, with FIG. 6A illustrating the simulated $E_x$ optical field. In like manner, the acoustic energy, at 2.31 GHz, is also strongly confined to the waveguide 510, with FIG. 6B illustrating the simulated $\epsilon_{yy}$ strain mode. By employing a higher order acoustic mode, an even higher coupling coefficient |g| can be achieved. As illustrated in FIG. 6C, the simulated $\epsilon_{yy}$ strain mode at 4.78 GHz provides even greater overlap with the $E_x$ mode of the optical field. This improvement is due, at least in part, to a change from coupling via the $p_{12}$ photoelastic constant of the $SiO_2$ cladding 514 to coupling via the $p_{11}$ photoelastic constant of the alumina waveguide core 512.

Figure 7:
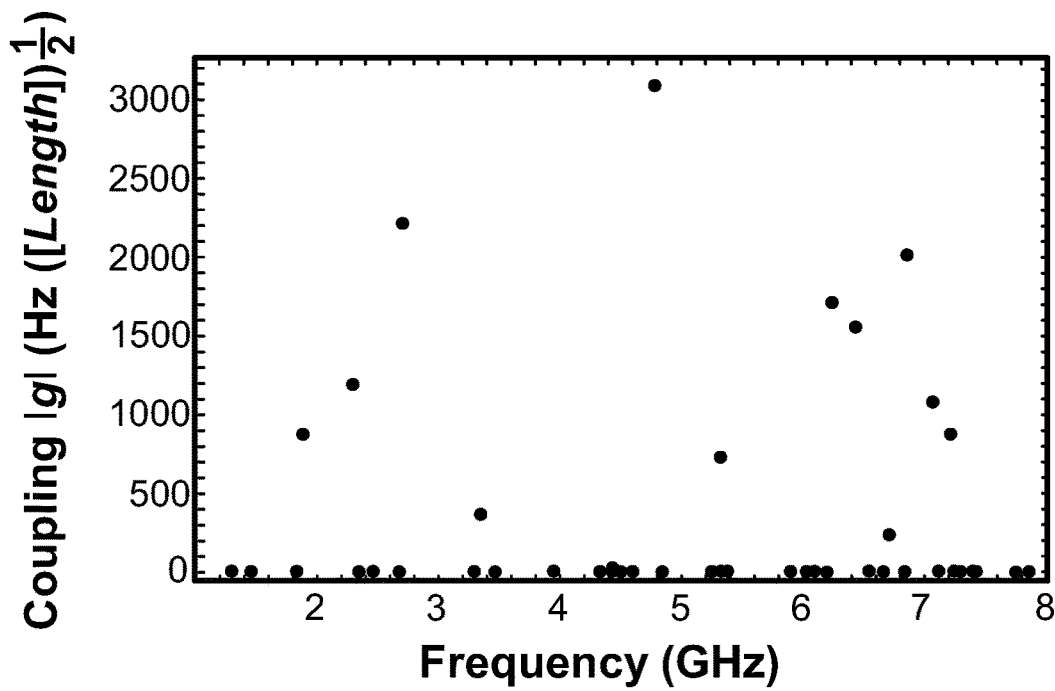
FIG. 7 illustrates the simulated optomechanical coupling coefficient $|g|$ as a function of the acoustic frequency for AO modulators in accordance with various embodiments of the present invention.

FIG. 7 illustrates the optomechanical coupling coefficient |g| of the AO modulator 500 as a function of the acoustic frequency with numerous configurations providing coupling coefficients |g| in excess of $$500 \frac{\text{rad}}{s} * \sqrt{m}.$$

The AO modulator 500 illustrated in FIGS. 5, 6A, 6B, and 6C, also illustrated in FIG. 7, produced a coupling coefficient |g| of approximately $$1200 \frac{\text{rad}}{s} * \sqrt{m}$$

at 2.31 GHz, which increased to just over $$3000 \frac{\text{rad}}{s} * \sqrt{m}$$

at the higher order mode driven at 4.78 GHZ, assuming a fixed boundary condition at the interface between the bottom of the $SiO_2$ cladding 514 and the top of the electrode 522A. Alternatively, the AO modulator 500 can be modeled with a fixed boundary condition at the interface between the bottom of the electrode 522B and the substrate 530. To account for phonon loss to the substrate 530, one could further refine the simulation by including a perfectly matched layer (PML) boundary condition some distance within the substrate 530. In contrast, for the suspended or near suspended configurations, such as those illustrated in FIGS. 2B-2F, the AO modulator is most accurately modeled with a free boundary condition around the entire waveguide 110-acoustic actuator 120 composite structure. This is a marked improvement over the coupling coefficients |g| achieved at the longer optical wavelength of 785 nm. It should be noted that high coupling coefficient |g| values can again be achieved even at frequencies in excess of 5 GHz.

Figure 8A:
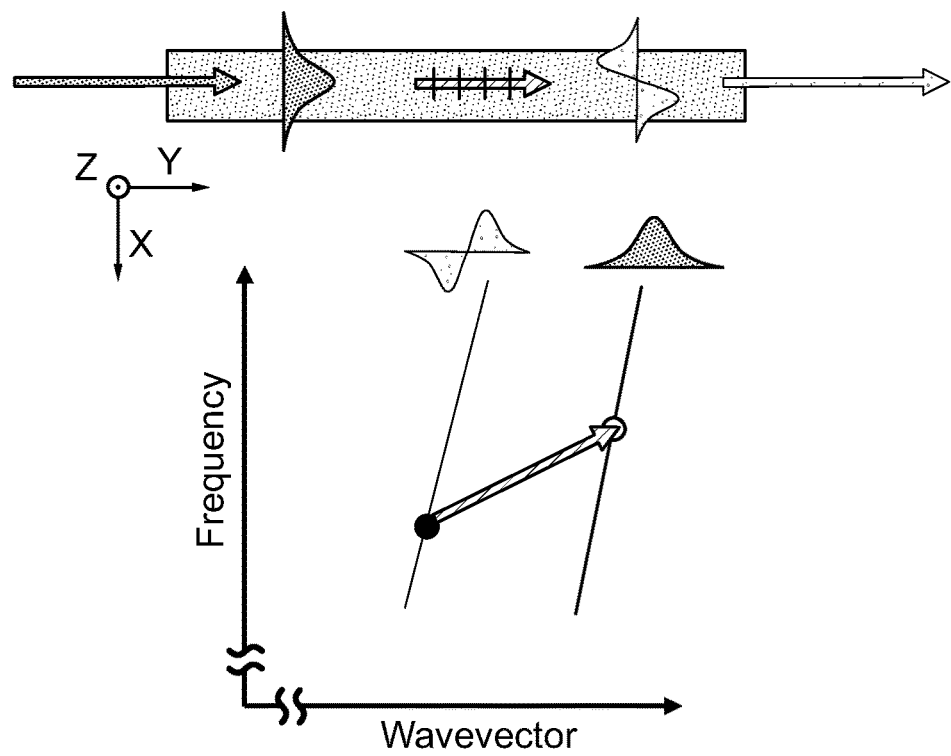
FIGS. 8A and 8B illustrate an inter-modal version of an AO modulator in accordance with one or more embodiments of the present invention in Stokes and anti-Stokes operation, respectively.
Figure 8B:
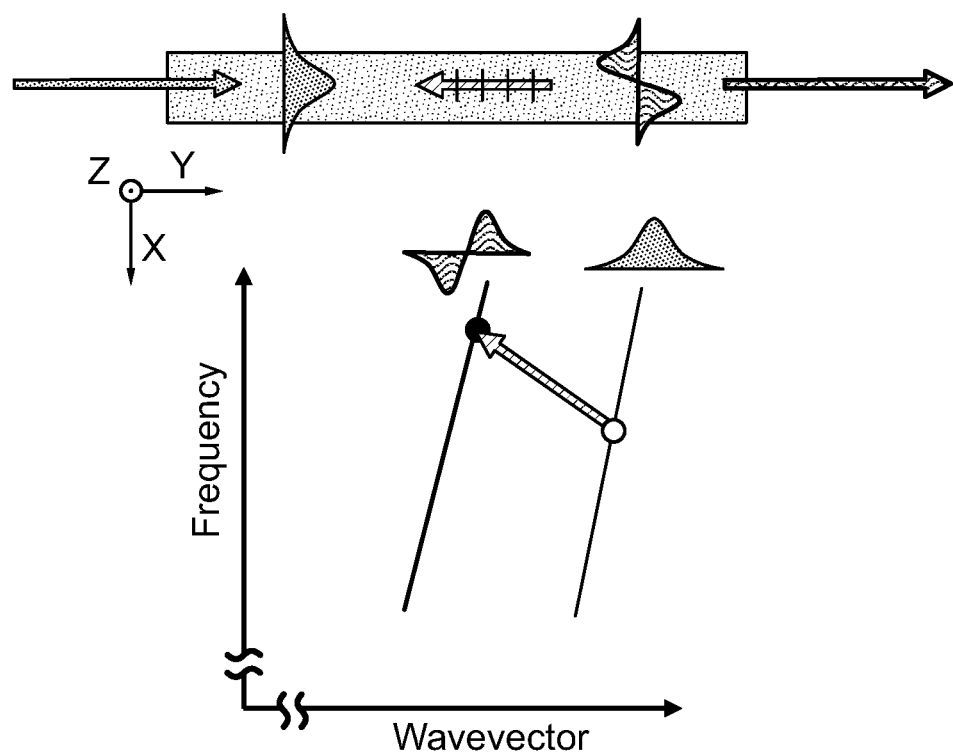

To achieve the desired decoupling of the Stokes and anti-Stokes processes, one must use the inter-modal approach. This inter-modal approach yields single-sideband scattering, with a corresponding red or blue shift depending upon the direction of the phonon. Note that the AO modulators illustrated in FIGS. 1-7 employ phonons with mechanical displacements primarily in the ±X and ±Z directions and do not propagate in the ±Y direction, while the AO modulators illustrated in FIGS. 8-14 employ phonons that also exhibit mechanical displacements primarily in the ±X and ±Z directions, but do yield displacement and propagation in the ±Y direction. While the cross-sections of all the AO modulators are similar, the AO modulators illustrated in FIGS. 8-14 employ directional acoustic transducers patterned in the X-Y plane to generate the phonons propagating in the ±Y direction. See, S. Lehtonen et al., "Unidirectional SAW Transducer for Gigahertz Frequencies," IEEE Transactions on Ultrasonics, Ferroelectrics, and Frequency Control, vol. 50, no. 11, pp. 1404-1406 (2003), the contents of which are incorporated herein by reference. As illustrated in FIG. 8A, if the photon and the phonon are co-propagating, i.e., the Stokes process, the photon is red shifted to a higher order optical mode. In contrast, and as illustrated in FIG. 8B, if the photon and the phonon are counter-propagating, i.e., the anti-Stokes process, the photon is blue shifted to a higher order optical mode. See E. A. Kittlaus et al., "On-Chip inter-modal Brillouin scattering," Nature Communications, art. no. 15819 (2017), the contents of which are incorporated herein by reference.

The acoustic transducers, formed as part of the AO modulators, may take any of several forms. As illustrated in FIG. 1, the electrodes 122A, 122B are located on either side of the piezoelectric active layer 124. This dual-sided electrode configuration produces standing-wave phonons with zero momentum, as required, for example, when producing optical phase modulation (see, for example, FIG. 13). In other embodiments, the top and/or bottom electrodes can be patterned (as shown, for example, in FIGS. 9A-9D), with such patterned electrodes producing phonons with a non-zero momentum. This patterned electrode configuration may be bidirectional in that the generated phonons may propagate in either direction (±Y directions) along the ridge formed of the waveguide 110 and the acoustic actuator 120 (this ridge is shown in cross-section in FIG. 1). In other embodiments, the acoustic transducers may preferably be unidirectional.

Figure 9A:
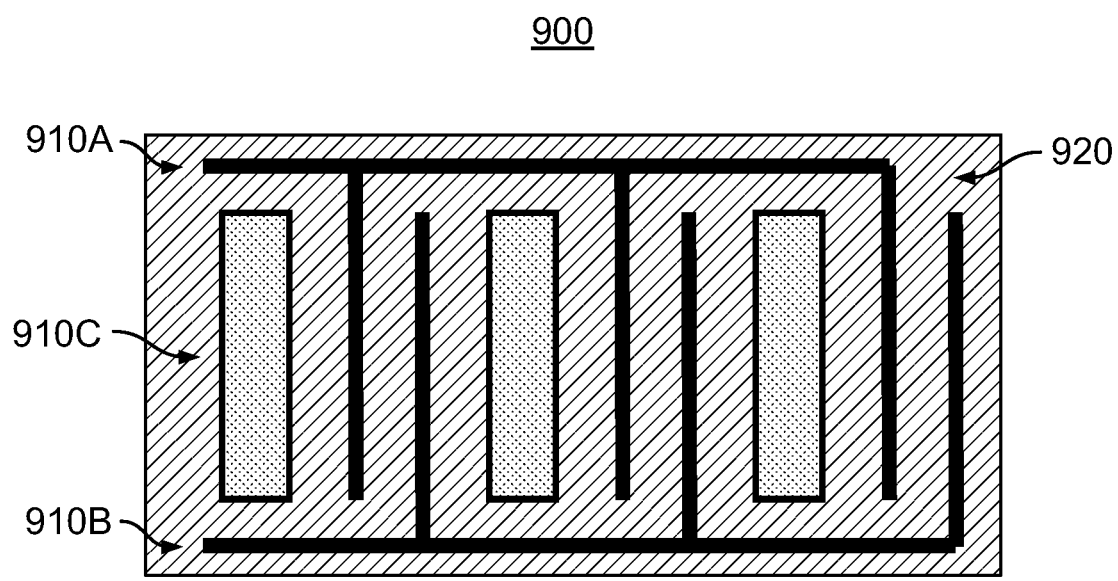
FIGS. 9A-9D illustrate various acoustic transducers that can be employed with AO modulators in accordance with various embodiments of the present invention.
Figure 9B:
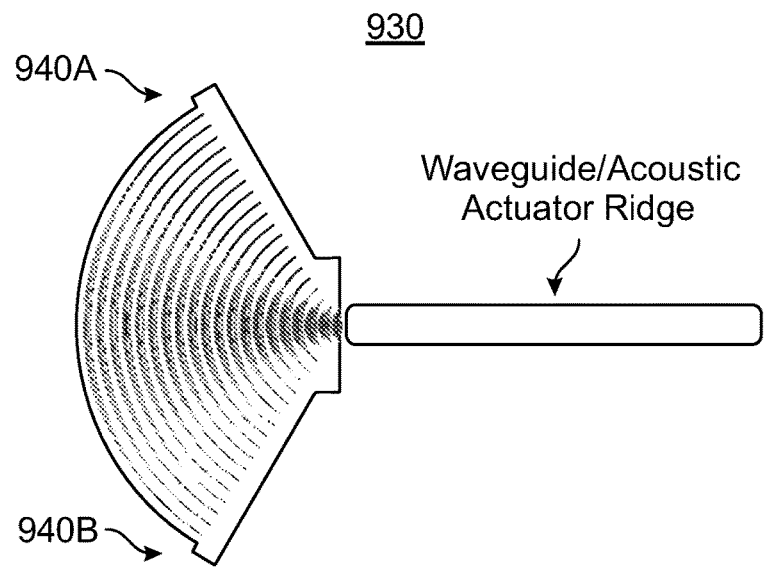
Figure 9C:
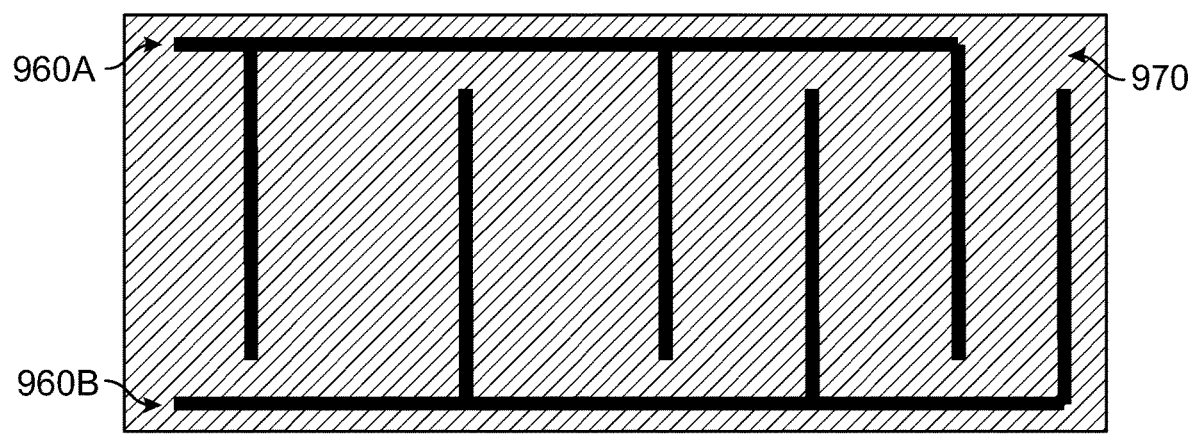
Figure 9D:
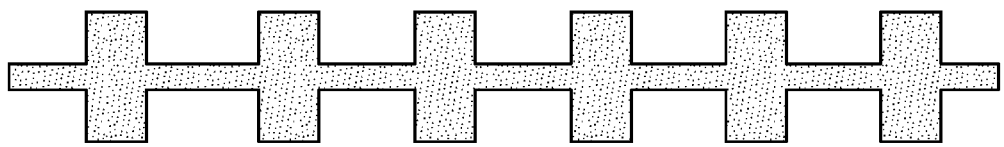
Figure 9D:
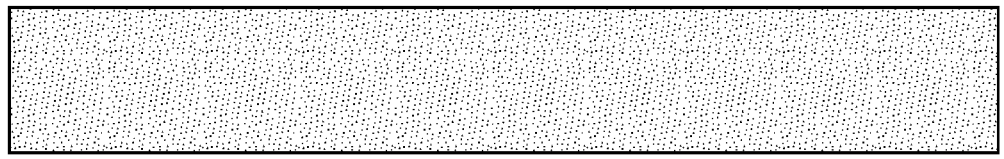

FIG. 9A illustrates a first unidirectional acoustic transducer, similar to that disclosed Lehtonen, in the form of a (SPUDT) 900. The SPUDT 900 places two biased electrodes 910A, 910B and a floating electrode 910C on the same side of the piezoelectric active layer 920. The periodic spacing between the two biased electrodes 910A, 910B and the floating electrode 910C is determined by the desired phonon frequency/wavelength. The SPUDT 900 may be included as part of the ridge formed of the waveguide and the acoustic actuator, or may be located adjacent to one end of the ridge. FIG. 9B illustrates a focusing acoustic transducer 930, which again employs two biased electrodes 940A, 940B on the same side of the piezoelectric active layer (not illustrated). The focusing acoustic transducer 930 would be located adjacent to one end of the ridge formed of the waveguide and the acoustic actuator, with the focus point of the focusing acoustic transducer 930 corresponding to the end of the ridge. FIG. 9C illustrates a chirped acoustic transducer 950, which also employs two biased electrodes 960A, 960B on the same side of the piezoelectric active layer 970. Though exaggerated in FIG. 9C, the spacing between adjacent fingers of the biased electrodes 960A, 960B is not consistent. This chirped spacing allows the generation of phonons over a range of frequencies/wavelengths. One can thereby tune the phonons to maximize coupling between the two optical frequencies/wavelengths, which may not be known a priori, for example, due to minor fabrication variations in the widths or thicknesses of the components forming the AO modulator. FIG. 9D illustrates a dual-sided biased-electrode acoustic transducer, with a top-side biased electrode 980A and a bottom-side biased electrode 980B, formed, for example, in electrodes 122A and 122B, respectively.

Figure 10A:
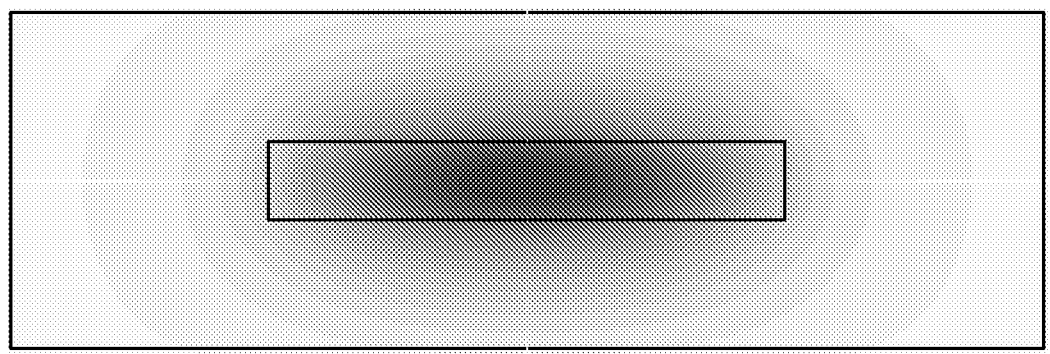
Figure 10A:
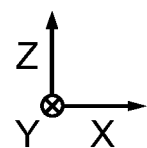
Figure 10B:
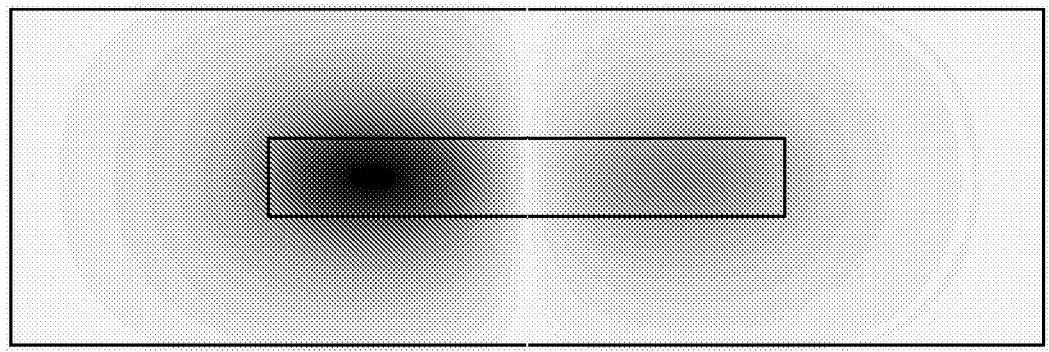
Figure 10B:
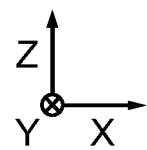

As with the previous AO modulators 100, 500, the optical and acoustic energies in an inter-modal AO modulator are strongly confined to the waveguide. The optical energy, at an optical wavelength of 420 nm, is strongly confined to the waveguide core in the first and second TE optical modes, with FIGS. 10A and 10B illustrating the simulated $E_x$ optical field for the first and second modes, respectively. In like manner, the acoustic energy, at 2.69 GHz, is also strongly confined to the waveguide, with FIG. 10C illustrating the simulated $\epsilon_{yy}$ strain mode.

Figure 11:
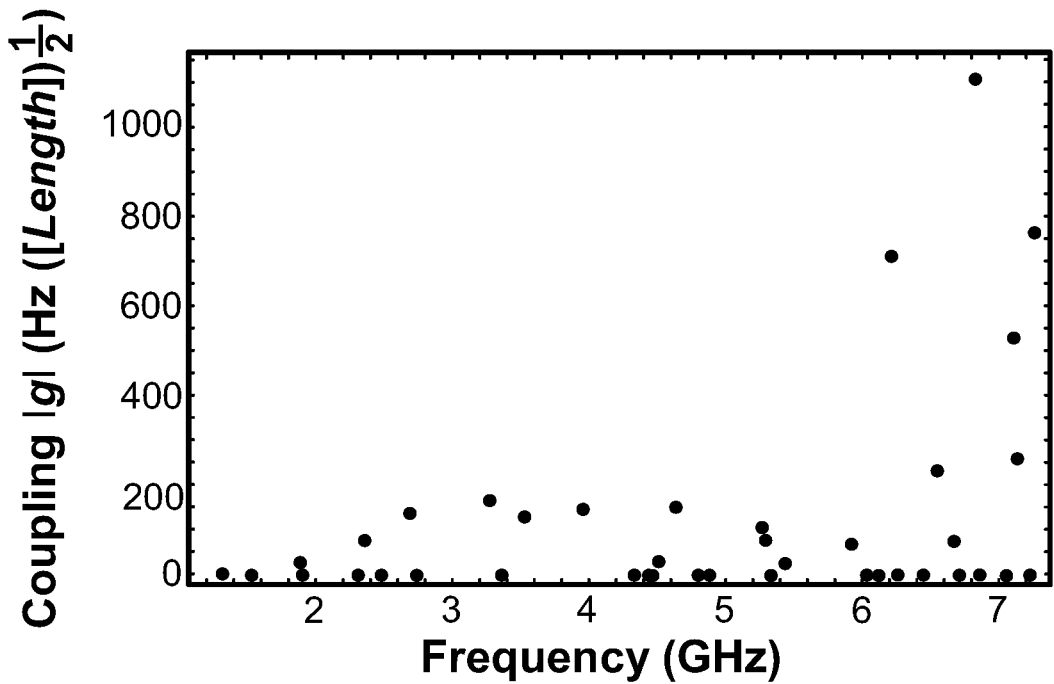
FIG. 11 illustrates the simulated optomechanical coupling coefficient $|g|$ as a function of the acoustic frequency for AO modulators in accordance with various embodiments of the present invention.

FIG. 11 illustrates the optomechanical coupling coefficient |g| of the inter-modal AO modulator as a function of the acoustic frequency with numerous configurations providing coupling coefficients |g| in excess of $$200 \frac{\text{rad}}{s} * \sqrt{m}.$$

Figure 10C:
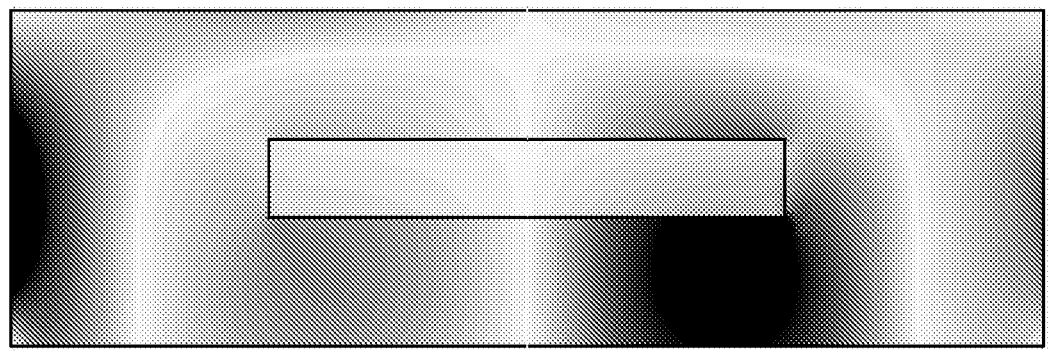
FIG. 10C illustrates the corresponding simulated $\epsilon_{yy}$ strain mode.
Figure 10C:
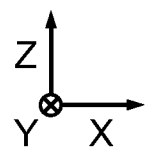

The inter-modal AO modulator illustrated in FIGS. 10A, 10B, and 10C, also illustrated in FIG. 11, produced a coupling coefficient |g| of approximately $$150 \frac{\text{rad}}{s} * \sqrt{m}$$

at 2.69 GHz, which increased to approximately $$1100 \frac{\text{rad}}{s} * \sqrt{m}$$

at the higher order mode driven at 6.82 GHz, assuming a fixed boundary at the waveguide-acoustic actuator interface. It should be noted that high coupling coefficient |g| values can again be achieved even at frequencies in excess of 5 GHz.

Figure 12A:
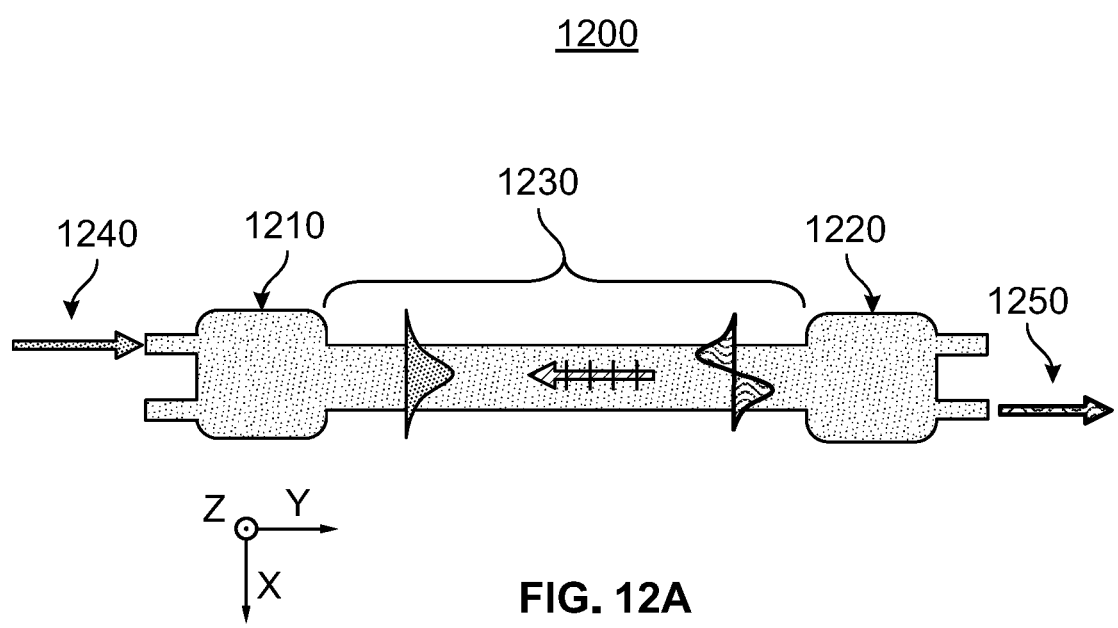
Figure 12B:
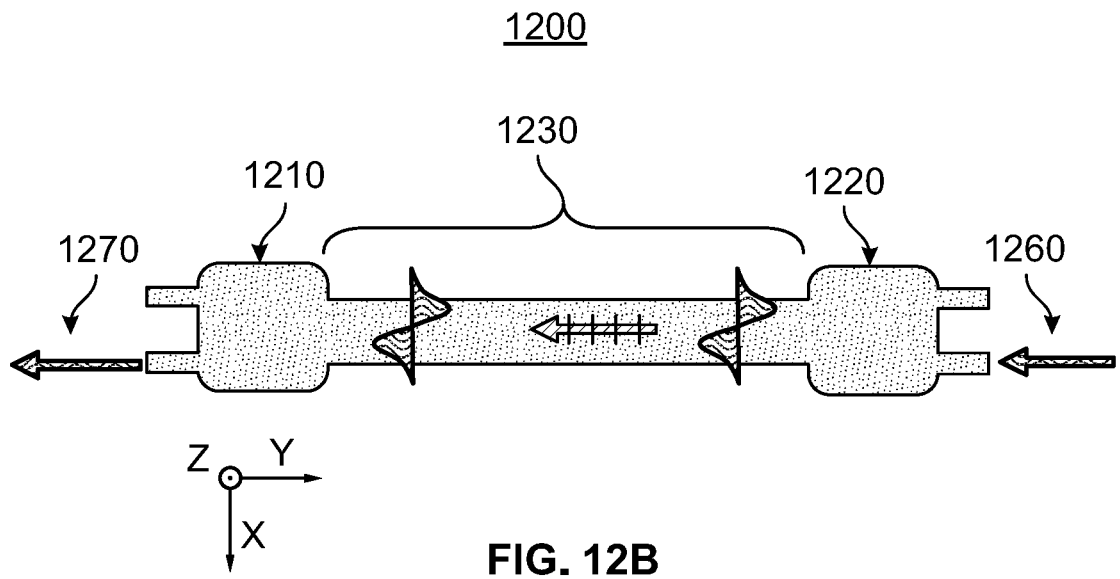
Figure 12C:
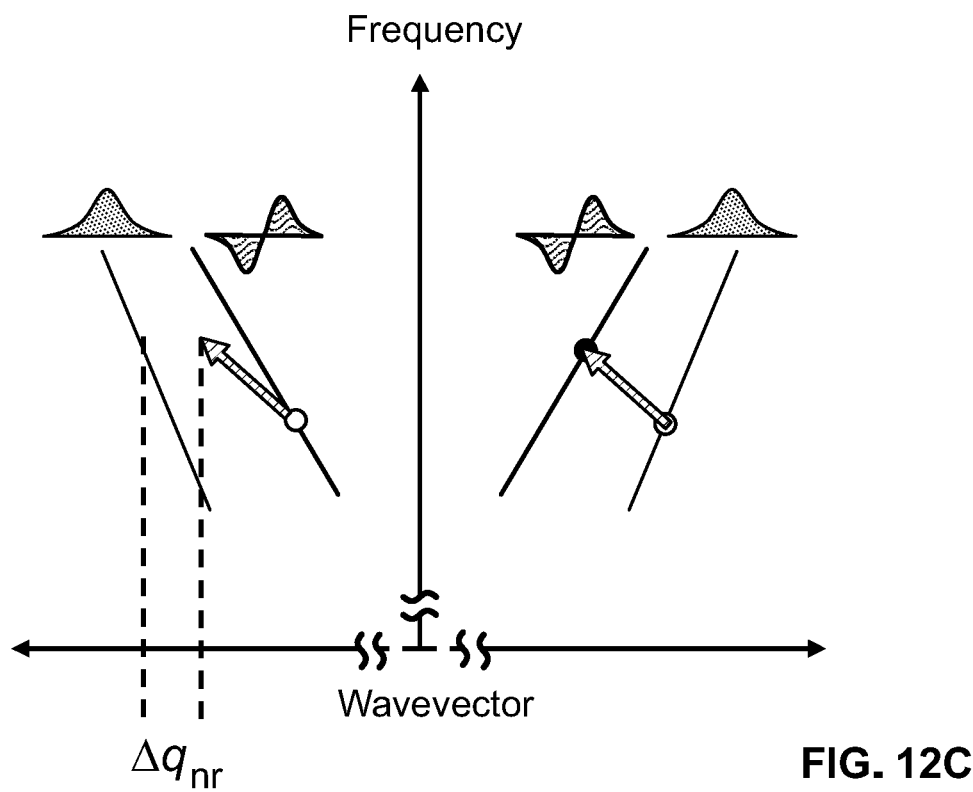
FIG. 12C illustrates the permitted anti-Stokes and unpermitted Stokes transitions.

The structure of at least one embodiment of the present invention may be used to implement a non-reciprocal device, for example, an isolator 1200, as illustrated in FIG. 12A. The isolator 1200 includes a first mode multiplexer 1210 and a second mode multiplexer 1220 at the opposite end of an AO modulator 1230 having a waveguide format, for example, those described above with reference to FIGS. 1 and 5. As illustrated, the first mode multiplexer 1210 and the second mode multiplexer 1220 each have a first port and a second port. The first port passes an optical signal in a fundamental optical mode, while the second port passes an optical signal in a higher order optical mode to the AO modulator 1230. A forward input optical signal 1240 enters a first port of the first mode multiplexer 1210. As the phonons in the AO modulator 1230 are counter-propagating with respect to the forward input optical signal 1240 and the forward input optical signal 1240 is in the fundamental optical mode, the net result is an inter-modal anti-Stokes configuration. In this configuration, the forward input optical signal 1240 is blue shifted to a higher order optical mode, which exits the second mode multiplexer 1220 as a forward output optical signal 1250 from a second port of the second mode multiplexer 1220. As illustrated in FIG. 12B, a reverse input optical signal 1260 enters the isolator 1200 via the second port of the second mode multiplexer 1220. The phonons in the AO modulator 1230 are co-propagating with respect to the reverse input optical signal 1260 and the reverse input optical signal 1260 is in the higher order optical mode, and the net result is a non-phase matched anti-Stokes configuration. In this configuration, the reverse input optical signal 1260 passes through the AO modulator 1230 without AO scattering and exits the first mode multiplexer 1210 as a reverse output optical signal 1270 from a second port of the first mode multiplexer 1210. Thus, the reverse output optical signal 1270 is shunted to the "blocking," i.e., second, port of the first mode multiplexer 1210, and thereby isolated from the "passing," i.e., first, port of the first mode multiplexer. FIG. 12C illustrates the permitted anti-Stokes transition for the forward input optical signal 1240 to the forward output optical signal 1250. FIG. 12C also illustrates that the anti-Stokes transition for the reverse input optical signal 1260 is not permitted for the given phononic input, as the phonon wavevector is "short" by the amount $\Delta g_{nr}$. See E. A. Kittlaus et al., "Non-reciprocal interband Brillouin modulation," Nature Photonics, vol. 12, pp. 613-619 (2018), the contents of which are incorporated herein by reference.

As will be appreciated, the isolator 1200 illustrated in FIG. 12 can also be operated as a single-sideband frequency shifter. The single-sideband frequency shifter employs only the "forward path" of isolator 1200, i.e., only the forward input optical signal 1240 and its anti-Stokes transition to form the forward output optical signal 1250.

The structures of various embodiments of the present invention may be used to implement other devices, including, for example, a phase modulator or a high-extinction shutter. Various embodiments of the invention may be employed in a variety of signal processing, atomic physics, and quantum information and quantum/classical sensing applications.

Figure 13:
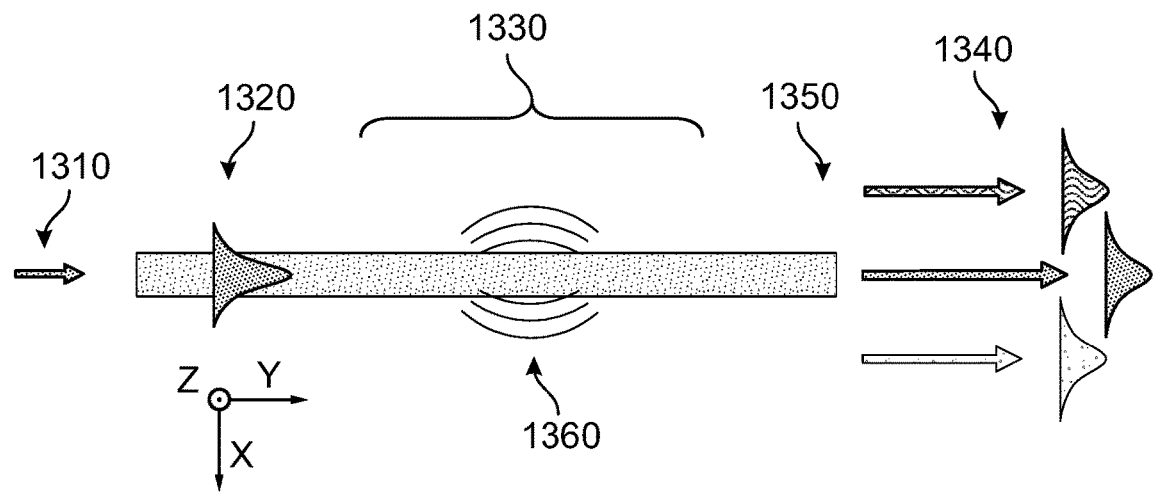
FIG. 13 illustrates a dual sideband phase modulator in accordance with one or more embodiments of the present invention.

FIG. 13 illustrates a dual-sideband phase modulator 1300 in accordance with at least one embodiment. An input optical signal 1310 is input at an input port 1320 and passes through an AO modulator 1330. The input optical signal 1310, upon undergoing intra-modal scattering in the AO modulator 1330, exits the phase modulator 1300 as an output optical signal 1340, via an output port 1350. The output optical signal 1340 includes a component at the same wavelength as the input optical signal 1310, but further includes both red- and blue-shifted, i.e., dual, sidebands. At high drive powers, the phase modulation results in a large number of sidebands given by the Jacobi-Anger expansion. The magnitude of the intra-modal scattering, controlled by an acoustic actuator (not illustrated), which generates a phononic standing wave 1360, determines the magnitude of the phase modulation.

Figure 14:
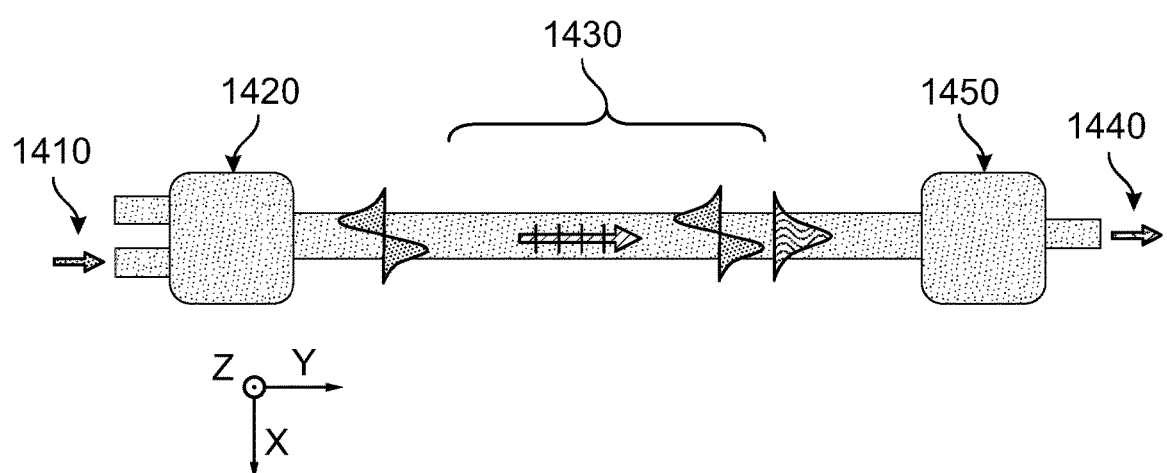
FIG. 14 illustrates a high-extinction shutter in accordance with one or more embodiments of the present invention.

FIG. 14 illustrates a high-extinction shutter 1400 in accordance with at least one embodiment. An input optical signal 1410 is input at a second port of a mode multiplexer 1420 as a higher order optical mode and passes through an AO modulator 1430. The input optical signal 1410, upon undergoing inter-modal AO scattering in the AO modulator 1430, i.e., conversion from the higher order mode to the fundamental optical mode, exits the high-extinction shutter 1400 as an output optical signal 1440, via a mode filter 1450. Due to the mode filter 1450 blocking light that is not scattered by the AO modulator 1430 into the fundamental optical mode, only light in the fundamental optical mode exits the mode filter 1450 as the output optical signal 1440. The magnitude of the inter-modal AO scattering, controlled by an acoustic actuator (not illustrated), determines the insertion loss of the high-extinction shutter 1400. As will be appreciated, when no bias is applied to the acoustic actuator, no inter-modal AO scattering occurs, no light is converted into the fundamental optical mode, and the unconverted light is blocked by the mode filter 1450, resulting in no output optical signal 1440.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An acousto-optic (AO) modulator comprising:
    a substrate including a surface layer formed of a first material;
    an acoustic actuator on the substrate, the acoustic actuator adapted to receive an actuator signal and to produce a corresponding acoustic signal upon receipt of the actuator signal, the substrate adapted to reduce an acoustic radiation loss from the acoustic actuator, the acoustic actuator including a second material; and
    a waveguide on a surface of the acoustic actuator opposite the substrate, the acoustic actuator and the waveguide being co-linear, the waveguide adapted to guide an optical signal, and to confine an energy of the optical signal, wherein the acoustic actuator and the waveguide are adapted to confine an energy of the acoustic signal such that efficient optomechanical coupling occurs between the optical signal and the acoustic signal and the optical signal and the acoustic signal are co-linear, the waveguide including:
        a waveguide core formed of a third material different than the second material, the third material adapted to transmit at least one of visible or ultraviolet wavelengths; and
        a cladding surrounding the waveguide core, the cladding formed of a fourth material different than the first material.

2. The AO modulator of claim 1, wherein the first material includes one of silicon or sapphire.

3. The AO modulator of claim 1, wherein the acoustic actuator includes:
    an active layer;
    a first electrode on a surface of the active layer; and
    a second electrode, the second electrode on a same or opposite surface of the active layer as the first electrode.

4. The AO modulator of claim 1, wherein the second material includes one of aluminum nitride, scandium aluminum nitride, or quartz.

5. The AO modulator of claim 3, wherein the first electrode and the second electrode each includes one of aluminum, an aluminum alloy, a silicide, or gold.

6. The AO modulator of claim 3, wherein at least one of the first electrode or the second electrode is patterned to form a directional acoustic transducer as part of the acoustic actuator, the directional acoustic transducer adapted to generate the acoustic signal.

7. The AO modulator of claim 6, wherein the directional acoustic transducer is one of a unidirectional acoustic transducer or a bidirectional acoustic transducer.

8. The AO modulator of claim 6, wherein the directional acoustic transducer is one of a single-phase unidirectional transducer or a chirped acoustic transducer.

9. The AO modulator of claim 1, wherein the third material includes one of silicon nitride, alumina, tantalum pentoxide, gallium phosphide, or titanium oxide.

10. The AO modulator of claim 1, wherein the fourth material includes silica.

11. The AO modulator of claim 1, wherein an optomechanical coupling coefficient |g| is greater than or equal to approximately $$50 \frac{\text{rad}}{s} * \sqrt{m}.$$

12. The AO modulator of claim 1, further comprising at least one of a pedestal, a tether, or a nano-pillar, the at least one of the pedestal, the tether, or the nano-pillar structurally connecting the acoustic actuator to the substrate, the at least one of the pedestal, the tether, or the nano-pillar adapted to reduce the acoustic radiation loss from the acoustic actuator to the substrate.

13. The AO modulator of claim 1, wherein the AO modulator implements one of an isolator function, a phase modulator function, a single-sideband frequency shifter function, or a high-extinction shutter function.

14. The AO modulator of claim 1, wherein the AO modulator implements an isolator function, the AO modulator further comprising:
    a first mode multiplexer, the first mode multiplexer optically coupled to a first end of the waveguide, the first mode multiplexer including:
        a passing port, the passing port adapted to receive a forward input optical signal in a fundamental optical mode, the first mode multiplexer adapted to optically couple the forward input optical signal to the waveguide; and
        a blocking port, the blocking port adapted to receive a reverse output optical signal in a higher order optical mode from the waveguide, the first mode multiplexer adapted to isolate the reverse output optical signal from the passing port; and
    a second mode multiplexer, the second mode multiplexer optically coupled to a second end of the waveguide opposite the first end of the waveguide, the second mode multiplexer including a second port, the second multiplexer adapted to receive a forward output optical signal in a higher order optical mode from the waveguide and to transmit the forward output optical signal to the second port, the second mode multiplexer further adapted to receive a reverse input optical signal in a higher order optical mode from the second port and to optically couple the reverse input optical signal to the waveguide.

15. The AO modulator of claim 1, wherein the AO modulator implements a phase modulator function, the acoustic signal being a phononic standing wave.

16. The AO modulator of claim 1, wherein the AO modulator implements a single-sideband frequency shifter function, the AO modulator further comprising:
    a first mode multiplexer, the first mode multiplexer optically coupled to a first end of the waveguide, the first mode multiplexer including a first port, the first port adapted to receive a forward input optical signal in a fundamental optical mode, the first mode multiplexer adapted to optically couple the forward input optical signal to the waveguide; and a second mode multiplexer, the second mode multiplexer optically coupled to a second end of the waveguide opposite the first end of the waveguide, the second mode multiplexer including a second port, the second mode multiplexer adapted to receive a forward output optical signal in a higher order optical mode from the waveguide and to transmit the forward output optical signal to the second port.

17. The AO modulator of claim 1, wherein the AO modulator implements a high-extinction shutter function, the AO modulator further comprising:

a mode multiplexer, the mode multiplexer optically coupled to a first end of the waveguide, the first mode multiplexer including a second port, the mode multiplexer adapted to receive an input optical signal in a higher order optical mode from the second port and to optically couple the input optical signal to the waveguide; and a mode filter, the mode filter optically coupled to a second end of the waveguide opposite the first end of the waveguide, the mode filter including a port, the mode filter adapted to receive an output optical signal from the waveguide and to transmit the output optical signal from the port when the output optical signal is in a fundamental optical mode, the mode filter further adapted to block the output optical signal when the output optical signal is in the higher order optical mode.

* * * * *